(12) United States Patent
Kawamoto

(10) Patent No.: US 8,029,879 B2
(45) Date of Patent: Oct. 4, 2011

(54) DISPLAY DEVICE HAVING PAIR OF GLASS SUBSTRATES AND METHOD FOR CUTTING IT

(75) Inventor: Satoru Kawamoto, Azumino (JP)

(73) Assignee: Sony Corporation, Tokyo (JP)

( * ) Notice: Subject to any disclaimer, the term of this patent is extended or adjusted under 35 U.S.C. 154(b) by 620 days.

(21) Appl. No.: 12/104,686

(22) Filed: Apr. 17, 2008

(65) Prior Publication Data

US 2008/0311817 A1    Dec. 18, 2008

(30) Foreign Application Priority Data

Jun. 18, 2007  (JP) .................. 2007-159825

(51) Int. Cl.
*B32B 3/30* (2006.01)
*G02F 1/1333* (2006.01)

(52) U.S. Cl. .......... 428/43; 428/167; 428/172; 428/192; 349/158

(58) Field of Classification Search .................. 428/1.1, 428/43, 167, 172, 192; 349/58, 158
See application file for complete search history.

(56) References Cited

U.S. PATENT DOCUMENTS 5,843,546 A * 12/1998 Eichhorn .................. 428/38

FOREIGN PATENT DOCUMENTS

| JP | 02-146134 | 12/1990 |
| JP | 08-217476 | 8/1996 |
| JP | 2003-131185 | 5/2003 |
| JP | 2006-198836 | 8/2006 |

OTHER PUBLICATIONS

Foreign patent office communication regarding related foreign Japanese application No. JP 2007-159825.

* cited by examiner

*Primary Examiner* — Donald J Loney
(74) *Attorney, Agent, or Firm* — K&L Gates LLP

(57) ABSTRACT

A display device includes a pair of glass substrates. On the side of each of the pair of glass substrates, a press mark is formed between a first end of each of the pair of glass substrates and a position at least 0.3 mm but no more than 3 mm away from the first end, another press mark is formed between a second end of each of the pair of glass substrates and a position at least 0.3 mm but no more than 3 mm away from the second end, a scribing groove having a predetermined scribing amount is formed between the press marks, and there are rib marks in the scribing groove.

2 Claims, 5 Drawing Sheets

10A

DISPLAY DEVICE HAVING PAIR OF GLASS SUBSTRATES AND METHOD FOR CUTTING IT

BACKGROUND

1. Technical Field

The present invention relates to a display device having a pair of glass substrates and a method for cutting it. Specifically, the invention relates to a display device having a pair of glass substrates and a method for cutting it in which, when a glass substrate of a display device is cut by an internal scribing method, vertical movement of a scribing wheel is reduced to improve the cutting efficiency, and that is less prone to cracking, chipping, and waste residue.

2. Related Art

Thin display devices such as LCDs have a bonded glass substrate pair. A process for manufacturing such display devices having a bonded glass substrate pair includes a process for cutting a large glass substrate pair into separate pieces and a process for cutting off peripheral portions. In such cutting processes, there is generally used a process including forming a scribing groove (also called "scribing") using, for example, a sintered diamond cutter (scribing wheel), and breaking. This known scribing and breaking process will be described with reference to FIGS. 8A to 8E.

FIGS. 8A to 8E are side views step by step illustrating the known scribing and breaking process.

A bonded glass substrate pair to be cut consists of a first glass substrate 51 and a second glass substrate 52. First, a scribing groove 54 is formed in the surface of the first glass substrate 51 using a scribing wheel 53 along a cutting line (FIG. 8A). Thereafter, the bonded glass substrate pair (51 and 52) is reversed and placed on a breaking table (not shown). A rubber roller 55 is pressed against the second glass substrate 52 at a position corresponding to the scribing groove 54. A crack 56 is thereby formed in the first glass substrate 51 from the scribing groove 54 (FIG. 8B). Next, a scribing groove 57 is formed in the surface of the second glass substrate 52 using the scribing wheel 53 along a cutting line (FIG. 8C). Thereafter, the bonded glass substrate pair (51 and 52) is reversed and placed on the breaking table. The rubber roller 55 is pressed against the first glass substrate 51 at a position corresponding to the scribing groove 57. A crack 58 is thereby formed in the second glass substrate 52 from the scribing groove 57 (FIG. 8D). In this way, the cracks 56 and 58 are formed in the bonded glass substrate pair (51 and 52). By removing portions $59_1$ and $59_2$ from the bonded glass substrate pair (51 and 52), a display panel 50 of a predetermined size is obtained (FIG. 8E).

Instead of the rubber roller 55, a breaking bar can be used in the breaking process (see JP-A-2003-131185).

In the scribing process, there is normally used a method in which scribing using a scribing wheel is performed throughout the length of a glass substrate (hereinafter referred to as "external cutting scribing method"). This external cutting scribing method is effective when the thickness of one of the pair of glass substrates is 0.3 mm or more. However, when the thickness of one of the pair of glass substrates is less than 0.3 mm (for example, 0.225 mm) as in display devices used in recent small mobile devices, using the above external cutting scribing method causes cracking and/or chipping at the start of scribing.

Therefore, in the case of scribing a thin glass substrate, there is used a scribing method in which scribing is performed inside the edge of a glass substrate by using a special scribing wheel (hereinafter referred to as "internal cutting scribing method"). This internal cutting scribing method is a method in which a head of a scribing machine is driven vertically so that a scribing wheel is lowered onto a portion inside the edge of a glass substrate, a scribing process is started, and thereafter the scribing wheel is raised before reaching the edge of the glass substrate. This internal cutting scribing method makes it possible to form a scribing groove without causing chipping even when the thickness of one of the pair of glass substrates is less than 0.3 mm.

In the case of the above-described external cutting scribing method, when the thickness of one of the pair of glass substrates is 0.3 mm or more, scribing grooves can be formed continuously in a plurality of glass substrates with the height of the scribing wheel held constant, without causing chipping. However, when the thickness of one of the pair of glass substrates is less than 0.3 mm, the external cutting scribing method is difficult to use because cracking and/or chipping occurs at the start of scribing.

In contrast, the internal cutting scribing method does not cause chipping at the start of scribing even when the thickness of one of the pair of glass substrates is less than 0.3 mm. However, since the portion between the edge of a glass substrate and the scribing start position is not scribed, the internal cutting scribing method is prone to waste residue. In addition, in order to form scribing grooves continuously in a plurality of glass substrates, it is necessary to repeat the processes of lowering the scribing wheel, forming a scribing groove, and raising the scribing wheel. Therefore, the capacity per unit time of the internal cutting scribing method is about 35% lower than that of the external cutting scribing method in which the height of the scribing wheel is held constant.

SUMMARY

An advantage of some aspects of the invention is to provide a display device having a pair of glass substrates and a method for cutting it in which, when a glass substrate of a display device is cut by an internal scribing method, vertical movement of a scribing wheel is reduced to improve the cutting efficiency, and that is less prone to cracking, chipping, and waste residue.

According to an aspect of the invention, a display device includes a pair of glass substrates. On the side of each of the pair of glass substrates, a press mark is formed between a first end of each of the pair of glass substrates and a position at least 0.3 mm but no more than 3 mm away from the first end, another press mark is formed between a second end of each of the pair of glass substrates and a position at least 0.3 mm but no more than 3 mm away from the second end, a scribing groove having a predetermined scribing amount is formed between the press marks, and there are rib marks in the scribing groove.

A press mark is a mark of exerting pressure without scribing. Rib marks are many vertical cracks parallel to each other generated when a scribing groove is formed in a glass substrate using a scribing wheel, along the moving direction of the scribing wheel. When these rib marks are formed, breaking can be successfully performed without causing horizontal cracks. A scribing amount is a depth of cutting by the blade with respect to the glass thickness.

In the case a display device having a bonded glass substrate pair manufactured by the known external cutting scribing method, rib marks are formed from the place at an end of a glass substrate where the blade edge starts scribing. In the case of a display device having a bonded glass substrate pair manufactured by a known internal cutting scribing method, clean cut surfaces are obtained between one end of a glass substrate and the scribing start position and between the scribing end position and the other end because the edge of the cutting blade is out of contact with the surface of the glass substrate, and rib marks are formed between the scribing start position and the scribing end position. However, this method is prone to waste residue during breaking.

When the following cutting method according to an aspect of the invention is used, a press mark is formed between one end of a glass substrate and the scribing start position because the edge of the cutting blade is pressed with a predetermined pressure so that the scribing amount is zero, and rib marks are formed between the scribing start position and the scribing end position. Therefore, a display device less prone to cracking, chipping, and waste residue can be provided.

A display device according to an aspect of the invention can be clearly distinguished from a display device manufactured by the known external cutting scribing method, by difference in the position in the side of the glass substrate pair where rib marks are formed. A display device according to an aspect of the invention can be clearly distinguished from a display device manufactured by the known internal cutting scribing method, by determining whether there is a press mark and whether there is a clean cut surface, on the side surface at each end of each glass substrate.

According to another aspect of the invention, a method for cutting a display device having a pair of glass substrates includes forming a scribing groove in the pair of glass substrates, and cutting by breaking along the scribing groove. While a cutting blade is moved from a first end of the pair of glass substrates to the scribing groove and from the scribing groove to a second end of the pair of glass substrates, the cutting blade is pressed against the pair of glass substrates with a predetermined pressure so that the scribing amount of the cutting blade is zero.

In the cutting method according to an aspect of the invention, the so-called internal cutting scribing method is used, and scribing grooves are not formed on the surface of each of the pair of glass substrates between a first end of each of the pair of glass substrates and a position at least 0.3 mm but no more than 3 mm away from the first end and between a second end of each of the pair of glass substrates and a position at least 0.3 mm but no more than 3 mm away from the second end. When the length of the portion where a scribing groove is not formed is less than 0.3 mm and the thickness of one of the pair of glass substrates is less than 0.3 mm, chipping occurs at the start of scribing. When the length of the portion where a scribing groove is not formed is 3 mm or more, a large waste residue remains. Considering the size of waste, the optimum range of the length of the portion where a scribing groove is not formed is at least 0.3 mm but no more than 0.6 mm.

When the cutting method according to an aspect of the invention is used, on the side of each of the pair of glass substrates, a press mark is formed between a first end of each of the pair of glass substrates and a position at least 0.3 mm but no more than 3 mm away from the first end, another press mark is formed between a second end of each of the pair of glass substrates and a position at least 0.3 mm but no more than 3 mm away from the second end, and rib marks are formed between the press marks.

When the cutting method according to an aspect of the invention is used, at each end of each of the pair of glass substrates, the cutting blade is in contact with the glass surface but the scribing amount is zero, and therefore cracking, chipping, and waste residue do not occur. In addition, the vertical moving distance of the cutting blade during forming a scribing groove is equal to the scribing amount of the cutting blade. The scribing amount of the cutting blade is much smaller than the thickness of the glass substrates. Therefore, the vertical moving distance of the cutting blade is much smaller than that of the known internal cutting scribing method. Therefore, the cutting method according to an aspect of the invention has substantially the same capacity as the known external cutting scribing method.

In the cutting method according to an aspect of the invention, it is preferable that the scribing amount of the scribing groove be set so that the rib marks formed in the scribing groove are at least 5% but no more than 20% of the thickness of each of the pair of glass substrates.

In general, in a scribing and breaking method, the scribing amount of a scribing groove is set from experience so that rib marks are 5% to 20% of the thickness of the glass substrate. By setting the scribing amount of the scribing groove within this numerical range, an excellent broken end face can be obtained.

In the cutting method according to an aspect of the invention, it is preferable that the thickness of each of the pair of glass substrates be less than 0.3 mm.

The cutting method according to an aspect of the invention can be applied even when the thickness of each of the bonded glass substrates is 0.3 mm or more. However, when the thickness of each of the bonded glass substrates is less than 0.3 mm, whereas the known external cutting scribing method causes chipping at the start of scribing, the cutting method according to an aspect of the invention does not cause chipping at the start of scribing. In addition, the cutting method according to an aspect of the invention has substantially the same capacity as the known external cutting scribing method. In addition, when a large glass substrate pair is cut into separate pieces, the outer dimension of the resulting display devices is more accurate as compared to the known methods. Therefore, when housings are attached in the module assembling process, defect in the outer dimension can be prevented, and therefore the yield rate is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

The embodiment of the invention will hereinafter be described with reference to an example, comparative examples, and the drawings. It is to be understood that the invention is not intended to be limited to the following embodiments, and various changes may be made therein without departing from the spirit of the invention. Such changes are also included in the scope of the invention.

Figure 1:
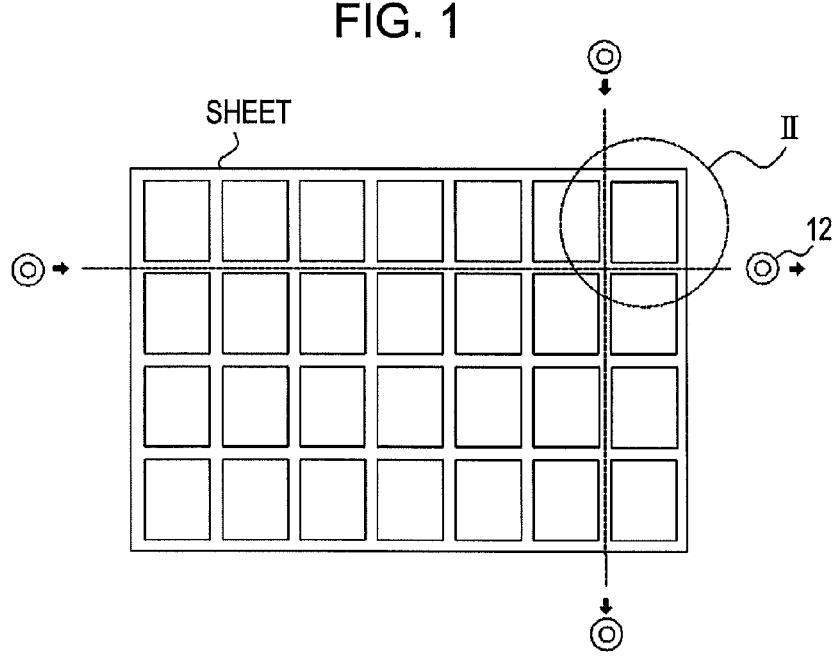
FIG. 1 schematically illustrates a process for cutting a large sheet into separate panels.
Figure 2:
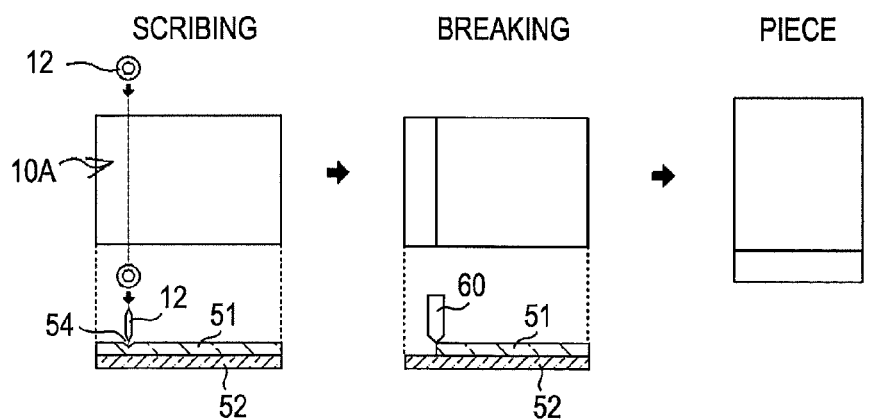
FIG. 2 schematically illustrates a scribing and breaking process of a panel obtained in FIG. 1.
Figure 3A:
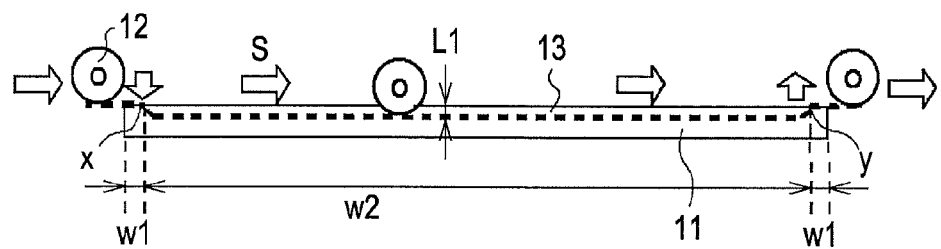
FIG. 3A schematically illustrates a scribing process of an example.
Figure 3B:
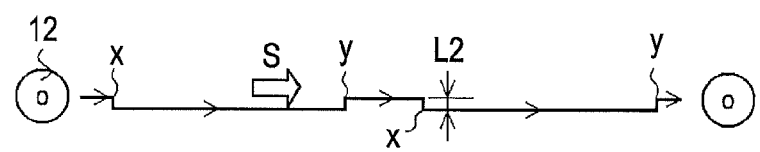
FIG. 3B shows a relative transfer pathway of a scribing wheel when the process shown in FIG. 3A is continuously performed on a plurality of glass substrate pairs.
Figure 4:
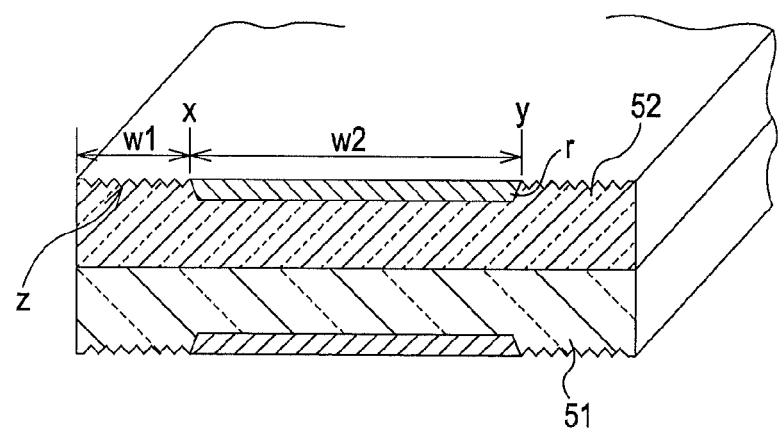
FIG. 4 is a side view of a glass substrate pair obtained in the example.
Figure 5A:
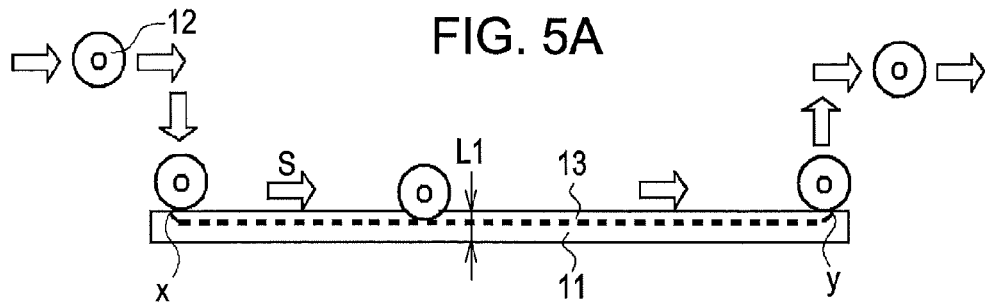
FIG. 5A schematically illustrates a scribing process by an internal cutting scribing method of comparative example 1.
Figure 5B:
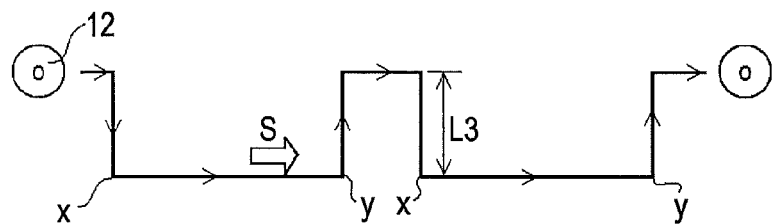
FIG. 5B shows a relative transfer pathway of a cutting blade when the process shown in FIG. 5A is continuously performed on a plurality of glass substrate pairs.
Figure 6A:
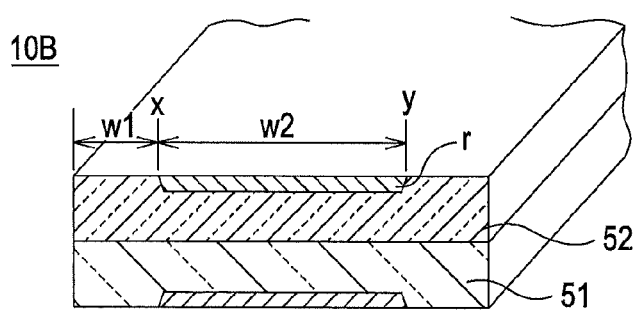
FIG. 6A is a side view of a glass substrate pair obtained in comparative example 1.
Figure 6B:
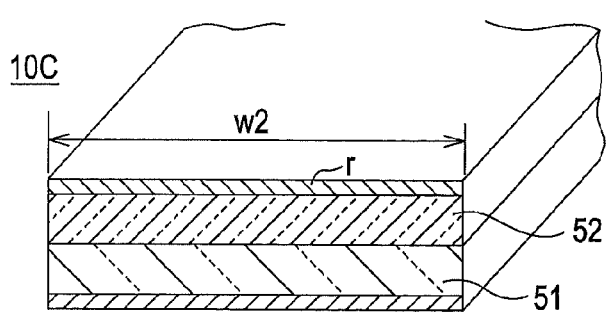
FIG. 6B is a side view of a glass substrate pair obtained in comparative example 2.
Figure 7:
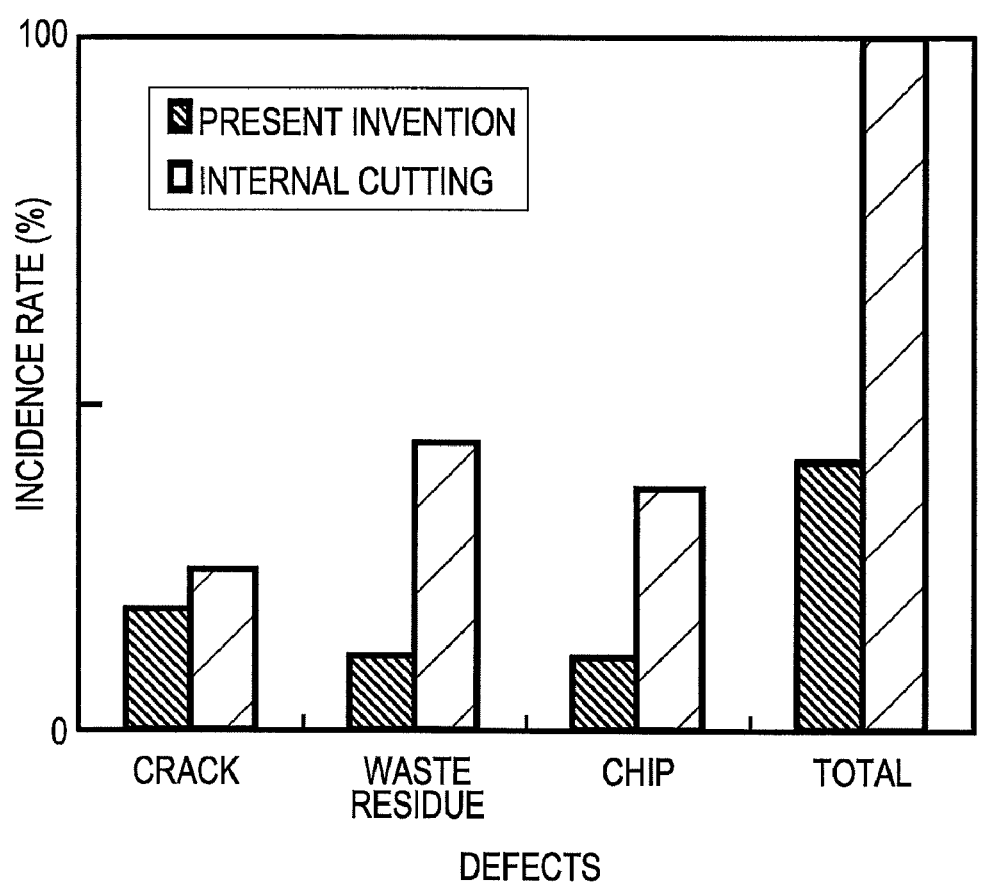
FIG. 7 is a comparative graph showing the defect incidence rate of a scribing method of the invention and that of a known internal cutting scribing method.

FIG. 1 schematically illustrates a process for cutting a large sheet into separate panels. FIG. 2 schematically illustrates a scribing and breaking process of a panel obtained in FIG. 1. FIG. 3A schematically illustrates a scribing process of an example. FIG. 3B shows a relative transfer pathway of a scribing wheel when the process shown in FIG. 3A is continuously performed on a plurality of glass substrate pairs. FIG. 4 is a side view of a glass substrate pair obtained in the example. FIG. 5A schematically illustrates a scribing process by an internal cutting scribing method of comparative example 1. FIG. 5B shows a relative transfer pathway of a cutting blade when the process shown in FIG. 5A is continuously performed on a plurality of glass substrate pairs. FIG. 6A is a side view of a glass substrate pair obtained in comparative example 1. FIG. 6B is a side view of a glass substrate pair obtained in comparative example 2. FIG. 7 is a graph showing the defect incidence rate of the scribing method of the invention and that of the known internal cutting scribing method.

EXAMPLE

First, as shown in FIG. 1, a large substrate sheet including a pair of glass substrates is separated vertically and horizontally in the directions of arrows. Next, as shown in FIG. 2, a resulting piece 10A is scribed with a scribing wheel 12 and is then broken with a breaking bar 60 to form a display device 10A.

The scribing process for manufacturing a display device of the example will be described with reference to FIGS. 3A and 3B. The thickness of each of the glass substrates used in the example is 0.225 mm. In FIG. 3A, for ease of explanation, a bonded glass substrate pair is denoted by reference numeral 11, and it is assumed that the bonded glass substrate pair 11 is stationary and a scribing wheel 12 moves relative to this bonded glass substrate pair 11.

First, the cutting blade of the scribing wheel 12 is moved horizontally at the same height with the surface of the bonded glass substrate pair 11 along a predetermined cutting line. After the cutting blade of the scribing wheel 12 has reached a first end of the glass substrate pair, the cutting blade of the scribing wheel 12 is moved on a portion of a width w1 between the first end and a scribing start position x while pressed against the surface of the bonded glass substrate pair 11 with a predetermined pressure (for example, 0.05 to 0.07 MPa) so that the scribing amount is zero. Next, at the scribing start position x, the cutting blade of the scribing wheel 12 is lowered so as to cut into the bonded glass substrate pair 11 by a predetermined depth L1 (for example, 0.15 mm). Holding this state, the cutting blade of the scribing wheel 12 travels a distance w2 to a scribing end position y at a second end of the bonded glass substrate pair 11 so as to form a scribing groove 13 in the surface of the bonded glass substrate pair 11. After the cutting blade of the scribing wheel 12 has reached the scribing end position y, the cutting blade of the scribing wheel 12 is moved on a portion of a width w1 between the scribing end position y and the second end while pressed against the surface of the bonded glass substrate pair 11 with the predetermined pressure so that the scribing amount is zero. The traveling speed S of the scribing wheel 12 in the horizontal direction is constant (for example, S=300 mm/s).

When the scribing wheel 12 is moved as described above so as to continuously form scribing grooves 13 in a plurality of bonded glass substrate pairs 11, the moving locus of the scribing wheel 12 is as shown in FIG. 3B by a solid line with arrows. That is, while moving horizontally at a constant speed S, the scribing wheel 12 is lowered by L2 at the scribing start position x, and is raised by L2 at the scribing end position y. Since this downward or upward moving distance L2 is equal to the scribing amount L1 of the cutting blade of the scribing wheel 12, necessary moving time is extremely short.

Figure 8A:
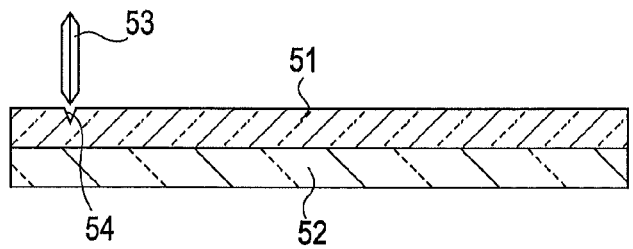
FIGS. 8A to 8E illustrate the process of a known scribing and breaking method.
Figure 8B:
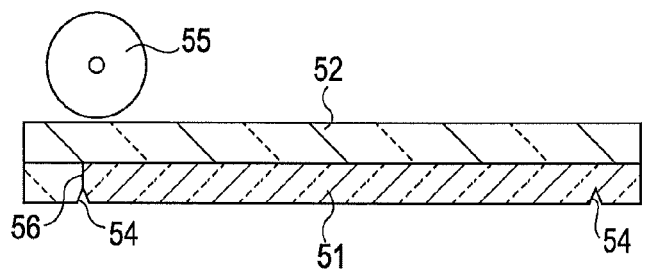
Figure 8C:
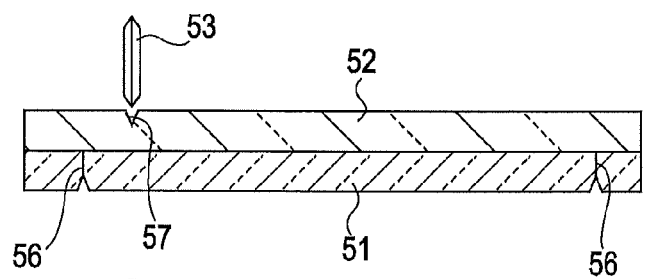
Figure 8D:
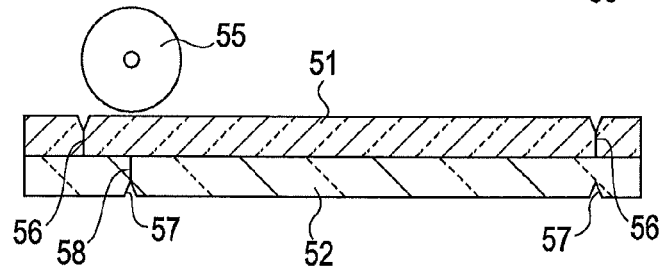
Figure 8E:
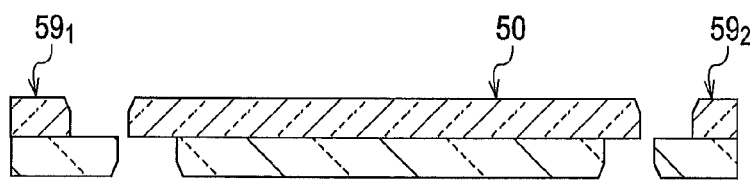

A display device 10A of the example is manufactured through the above-described scribing process and the known breaking process shown in FIGS. 8A and 8E. The structure of a broken end face of the display device 10A will be described with reference to FIG. 4. In the glass substrates pair of the display device 10A manufactured in the example, there is no chipping at each end. In the portion of width w1 between the first end and the scribing start position x, a press mark z can be seen but no rib marks are formed. Rib marks r are formed from a position slightly away from the scribing start position.

These press marks z found in the side surfaces of the glass substrates are generated because, in the portion of width w1 of each surface of the glass substrate pair 11 between the first end and the scribing start position x, the cutting blade is pressed against the glass substrate pair 11 with a predetermined pressure so that the scribing amount is zero. A case where the width w1 between the first end and the scribing start position x is less than 0.3 mm is substantially the same as the case of the external cutting scribing method. In this case, when the thickness of one of the pair of glass substrates is less than 0.3 mm, chipping occurs at the start of scribing. When the width w1 between the first end and the scribing start position x is 3 mm or more, a large waste residue remains. The range of the width w1 between the first end and the scribing start position x where a press mark z is formed is preferably 0.3 mm to 3 mm. The range of the width w1 is more preferably 0.3 mm to 0.6 mm. In this case, the waste residue is small, and no chipping occurs at each end even when the glass substrate pair is thin. The depth L1 of the scribing groove can be selected from the normally used range, that is, 5% to 20% of the thickness of one of the glass substrates, and the optimum value thereof is 10%.

The condition of the portion of width w1 between the scribing end position y and the second end is substantially the same as that of the above-described portion of width w1 between the first end and the scribing start position x. A display device manufactured by this scribing method has press marks in the portions of width w1. Therefore, compared to the known internal cutting scribing method, this method is less prone to waste residue, and the incidence rate of cracking and chipping is lower. In addition, the outer dimension of the display device is more accurate as compared to the known methods. Therefore, during the module assembling process, defect in the outer dimension can be prevented, and therefore the yield rate is improved.

FIG. 7 is a graph for comparing the defect incidence rate of the scribing method of the invention with that of the known internal cutting scribing method. As can be seen from this graph, the defect incidence rate of the scribing method of the invention is about half of the defect incidence rate of the known internal cutting scribing method. Using the scribing method of the invention can effectively reduce cracking, chipping, and waste residue, which chronically occur in the known method. As for the external cutting scribing method, it is not shown in the comparative graph because chipping occurs at a rate of about 25% and the defect incidence rate is too high.

Comparative Example 1

The scribing process for manufacturing a display device of comparative example 1 will be described with reference to FIGS. 5A and 5B. The thickness of each of the glass substrates used in the comparative example 1 is 0.225 mm as in the example. In FIGS. 5A and 5B, the same reference numerals will be used to designate the same portions as those in the example. The scribing method of this comparative example 1 is known as the internal cutting scribing method.

First, while held at a predetermined height above the surface of the bonded glass substrate pair 11, the cutting blade of the scribing wheel 12 travels a distance w1 horizontally along a predetermined cutting line. After the cutting blade of the scribing wheel 12 has reached a scribing start position x, the cutting blade of the scribing wheel 12 is lowered, and a predetermined pressure (for example, 0.05 to 0.07 MPa) is exerted so that the cutting blade cuts into the bonded glass substrate pair 11 by a predetermined depth L1 (for example, 0.15 mm). Holding this state, the cutting blade of the scribing wheel 12 travels a distance w2 to a scribing end position y at a second end of the bonded glass substrate pair 11 so as to form a scribing groove 13 in the surface of the bonded glass substrate pair 11. After the cutting blade of the scribing wheel 12 has reached the scribing end position y, the cutting blade of the scribing wheel 12 is raised to the initial height and travels a distance w1 to the second end. The traveling speed S of the scribing wheel 12 in the horizontal direction is constant (for example, S=300 mm/s).

When the scribing wheel 12 is moved as described above so as to continuously form scribing grooves 13 in a plurality of bonded glass substrate pairs 11, the moving locus of the scribing wheel 12 is as shown in FIG. 5B by a solid line with arrows. That is, while moving horizontally at a constant speed S, the scribing wheel 12 is lowered by L3 at the scribing start position x, and is raised by L3 at the scribing end position y. This upward or downward moving distance L3 is much longer than the scribing amount L1 of the cutting blade of the scribing wheel 12. Therefore, a much longer time is required in comparison to the case of the example.

A display device 10B is manufactured through the above-described scribing process and the known breaking process shown in FIGS. 8A and 8E. The structure of a broken end face of the display device 10B will be described with reference to FIG. 6A. In the case of the glass substrate pair 11 of the display device 10B manufactured in comparative example 1, the cutting blade is out of contact with the surface of the glass substrate pair 11 when moving from the first end to the scribing start position x. Therefore, in this portion of width w1, the upper surface is completely flat, and the side surface is a clean cut surface. In addition, rib marks r are formed from a position slightly away from the scribing start position x. However, since the clean cut surface includes neither a press mark nor a cut, the method of comparative example 1 is prone to waste residues. In addition, since the outer dimension is not precise, the yield rate declines.

Comparative Example 2

In comparative example 2, a pair of glass substrates 0.6 mm thick bonded together is cut using the known external cutting scribing method so as to manufacture a display device. The side surface of the display device 10C of this comparative example 2 will be described with reference to FIG. 6B. As is clear from FIG. 6B, in the display device 10C having a bonded glass substrate pair of comparative example 2, rib marks r are formed from the place at an end of the glass substrate pair where the blade edge starts scribing. In the case of this scribing method, scribing grooves are formed from an end of the glass substrate pair. Therefore, when the thickness of the glass substrates is small, the incidence rate of cracking and chipping is high (about 25%). Although the process time is short, this method is not good for cutting a thin display device.

As described above, the display device 10A of the invention can be clearly distinguished from the display device 10C manufactured by the known external cutting scribing method of comparative example 2, by difference in the position in the side of the glass substrate pair where rib marks are formed. The display device 10A can be clearly distinguished from the display device 10B manufactured by the known internal cutting scribing method, by determining whether there is a press mark z (example) and whether there is a clean cut surface (comparative example 1), on the side surface at each end of each glass substrate.

In the example, one of the pair of glass substrates is 0.225 mm or less in thickness. When one of the pair of glass substrates is less than 0.3 mm in thickness, the application of the invention is particularly advantageous because the application of the known external cutting scribing method is difficult. However, the invention can also be applied to a pair of glass substrates one of which is 0.3 mm or more in thickness. The invention can be effectively applied to a pair of glass substrates one of which is about 0.1 mm or more in thickness. It is undesirable to apply the invention to a pair of glass substrates one of which is less than about 0.1 mm in thickness because the resulting display device is weak.

What is claimed is:

1. A display device comprising a pair of bonded glass substrates, wherein, on the side of each of the pair of bonded glass substrates, a press mark is formed between a first end of each of the pair of bonded glass substrates and a position at least 0.3 mm but no more than 3 mm away from the first end, another press mark is formed between a second end of each of the pair of bonded glass substrates and a position at least 0.3 mm but no more than 3 mm away from the second end, a scribing groove having a predetermined scribing amount is formed between the press marks, and there are rib marks in the scribing groove.

2. The display device according to claim 1, wherein the thickness of one of the pair of glass substrates is less than 0.3 mm.

* * * * *